United States Patent [19]
Aubert et al.

[11] 3,989,290
[45] Nov. 2, 1976

[54] DEVICE FOR CLOSING A PRESSURE VESSEL

[75] Inventors: Gilles Aubert, Orsay; Gilles Barras, Bezons; Didier Costes, Paris, all of France

[73] Assignee: Commissariat a l'Energie Atomique, Paris, France

[22] Filed: Apr. 24, 1975

[21] Appl. No.: 571,312

[30] Foreign Application Priority Data
May 2, 1974 France .................. 74.15283

[52] U.S. Cl. .................. 292/256.65; 292/144; 52/223 R
[51] Int. Cl.² .................................. E05C 1/00
[58] Field of Search ............ 52/21, 246, 223, 224; 292/256, 144, 256.65

[56] References Cited
UNITED STATES PATENTS

| | | | |
|---|---|---|---|
| 3,353,859 | 11/1967 | Schupack | 52/224 X |
| 3,856,338 | 12/1974 | Johnsson | 292/256 |
| 3,913,960 | 10/1975 | Costes | 292/256.65 |

*Primary Examiner*—Richard E. Moore
*Attorney, Agent, or Firm*—Cameron, Kerkam, Sutton, Stowell & Stowell

[57] ABSTRACT

Closure elements uniformly spaced at the periphery of a concrete plug are each applied at one end against the top face of the plug and at the other end against the corbel of a prestressed concrete pressure vessel. Each closure element is constituted by a hydraulic jack whose closed extremity is coupled to a first articulated bearing shoe. Adjustable mechanical means within the jack body maintain this latter in contact with an annular shoulder of the jack piston in all relative positions, the emergent extremity of the piston being coupled to a second articulated bearing shoe.

4 Claims, 4 Drawing Figures

DEVICE FOR CLOSING A PRESSURE VESSEL

This invention relates to a device for closing a pressure vessel.

In more precise terms, the present invention is directed to a system for prestressing and clamping as applicable in particular to the top closures of large pressurized containment vessels of the type employed in nuclear energy and more especially to the lids or top seal plugs of prestressed concrete pressure vessels for light-water reactors of the PWR or BWR type (pressurized-water or boiling-water reactors).

This applies in particular to the concrete pressure vessel of a boiling-water reactor which is designed to withstand a normal internal pressure of 70 bar and an accidental pressure of 100 bar, in which the top closure plug of the cylindrical vessel shell has a diameter of 5 to 8 meters. The plug rests on a seating within a top opening in the vessel structure and means for applying thrust and clamping in compression are placed at uniform intervals between the closure plug and the walls of the external vessel-opening extension. The seal provided between the vessel shell and the vessel cap may or may not permit of relative displacement; when use is made of a metallic seal of the $\Omega$ section type, a slight displacement of the pressure vessel is permissible at the time of pressurization. Other types of seal must always remain compressed between two flat or conical surfaces and require an axial clamping force which exceeds the load stress or in other words call for the application of full prestress.

The present invention is more particularly concerned with the first type of sealing system.

A device for clamping the closure plug and obtaining prestress is already known and has been disclosed in French Pat. No. 1,594,967. Clamping of the closure plug is obtained by means of a certain number of thrust members or struts which are applied at one extremity against the vessel shell and at the other extremity against a wedge placed between the vessel cap and said strut extremity. Prestress is obtained by forcibly inserting said wedge. The disadvantage of this device lies is the fact that it is relatively complex and cumbersome in addition to the fact that an effect of prestress is produced solely by a mechanical method of insertion of wedges. The initial clamping pressure applied by the closure plug against the vessel shell is consequently of a very low order.

The precise object of this invention is to provide a device for closing a pressure vessel which overcomes the disadvantages mentioned in the foregoing, with the result in particular that prestress can readily be applied, that the mechanism employed for applying prestress can very readily be put into operation and that a high clamping pressure is supplied for applying the closure plug against the vessel shell.

The device for closing the top plug of the prestressed concrete pressure vessel of a nuclear reactor against the plug seating essentially comprises a plurality of closure elements uniformly spaced at the periphery of said closure plug, each closure element being applied at one end against the top face of said plug and at the other end against a corbel formed on the top extension of the pressure vessel, each closure element being essentially constituted by a jack body in which the closed extremity is rigidly fixed to a first articulated bearing shoe and by a piston which is capable of moving within said jack body under the action of a fluid under pressure, the extremity of said piston which emerges from said jack body being provided with an annular shoulder for preventing penetration of said piston into the interior of said jack body to the full extent, said jack body being provided with adjustable mechanical means for ensuring contact between said jack body and said annular shoulder of said piston irrespective of the position of said piston with respect to said jack body, the emergent extremity of said piston being rigidly fixed to a second articulated bearing shoe.

In a preferred embodiment, the adjustable mechanical means are constituted by two annular members forming an extension of the jack body and surrounding said piston, the first annular member being provided with a flat face in contact with the open extremity of the jack body and with a surface which is in contact with the second annular member and constituted by at least two relatively displaced portions of helicoidal surface, the shape of the second annular member being identical with that of the first and the two non-flat faces being in contact with each other.

In accordance with a third characteristic feature, each shoe has a bearing surface of convex cylindrical shape, the cylindrical face of the first shoe of a closure element being adapted to cooperate with a portion of concave cylindrical surface formed at the closed extremity of the jack body, the cylindrical face of the second shoe of said closure element being adapted to cooperate with a portion of concave cylindrical surface formed at the free extremity of the piston.

A more complete understanding of the invention will in any case be gained from the following description of one embodiment of the invention which is given by way of example without any implied limitation, reference being made to the accompanying drawings, in which.

Figure 1:
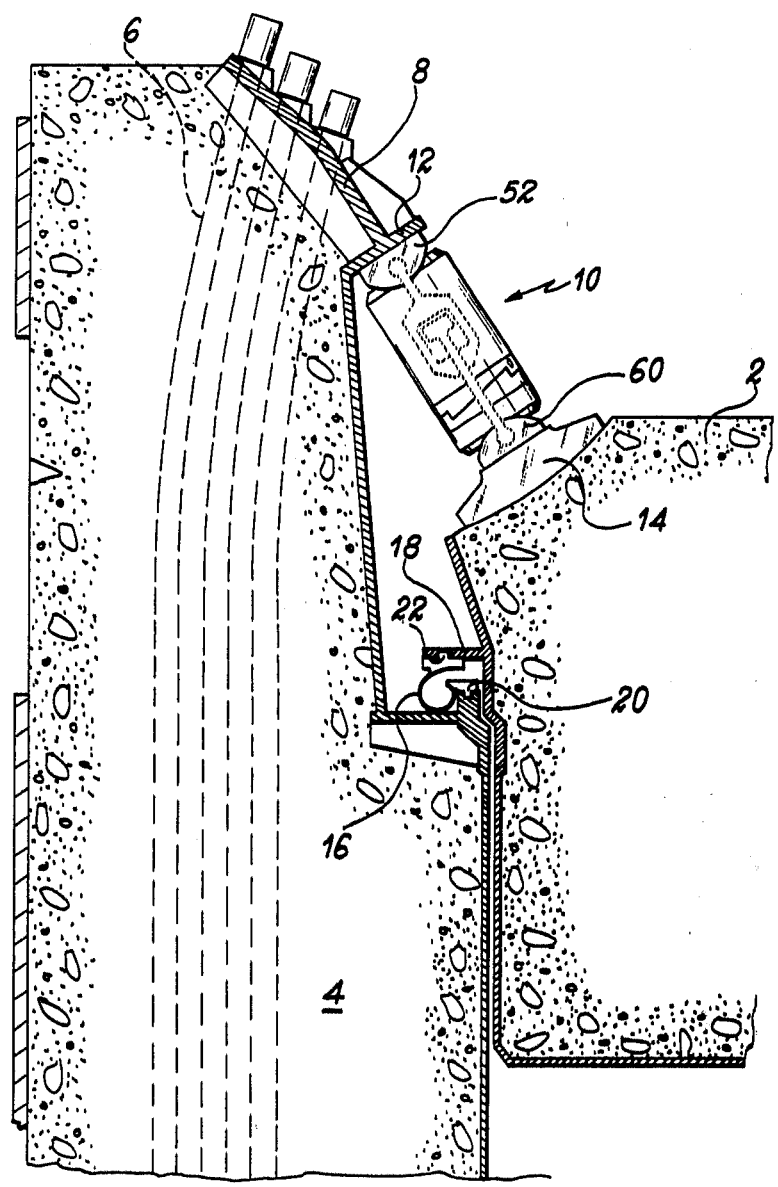
FIG. 1 is a general view showing the position-location of a closure element between the prestressed concrete vessel of the reactor and the closure plug.
Figure 2:
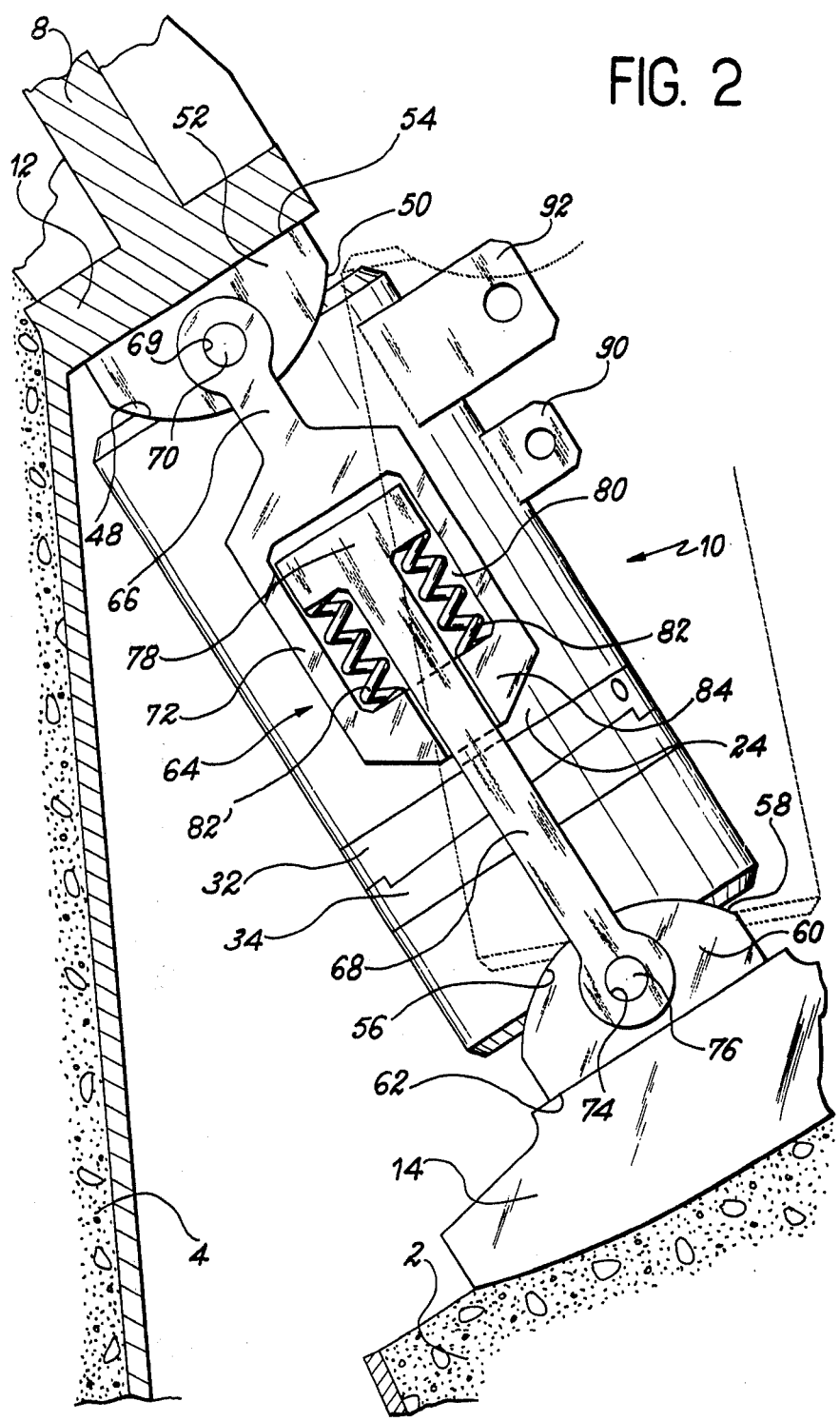
FIG. 2 is a view in elevation showing a closure device in accordance with the invention.
Figure 3:
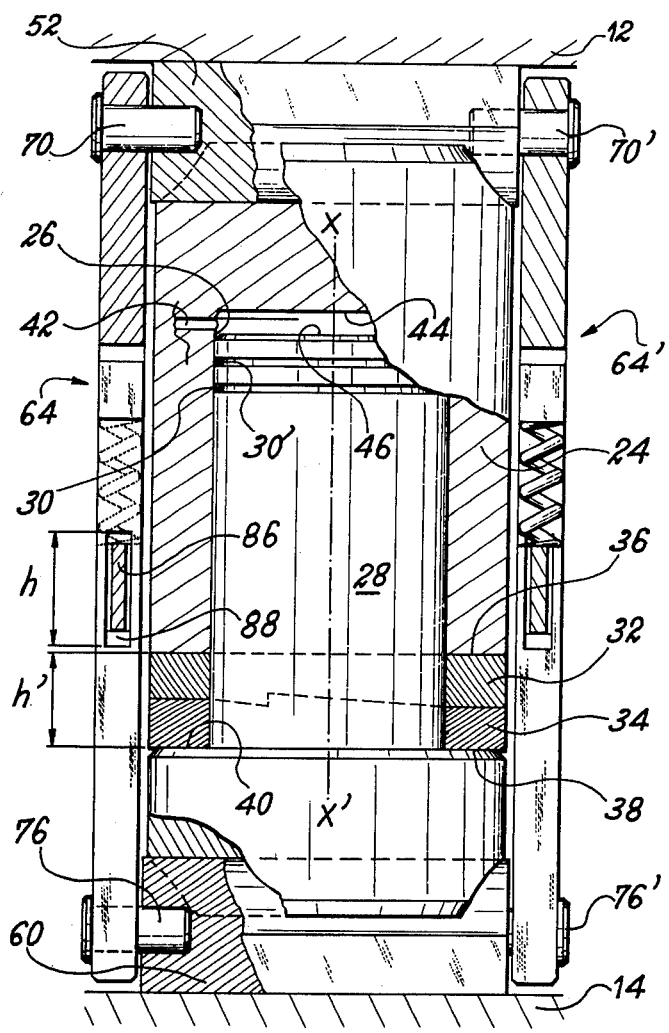
FIG. 3 is a part-sectional view in elevation showing the device of FIG. 2.

The general FIG. 1 shows part of the closure plug 2 of the reactor and part of the prestressed concrete pressure vessel 4. The concrete vessel prestressing cables are shown in dashed lines and designated by the reference numeral 6, the ends of said cables being anchored in a metallic member 8. Prestressing of the closure plug 2 is obtained by means of a plurality of closure elements 10 which form the subject of the invention. By way of example, the complete closure device comprises 24 elements uniformly spaced at the periphery of the closure plug 2. The closure element 10 is applied at one end against the face 12 of the metallic member 8 which is rigidly fixed to the pressure vessel 4 and at the other end against the thrust-bearing pad 14 which is rigidly fixed to the reactor closure plug 2. Leak-tightness is obtained by means of a circular seal 16 having a cross-section in the shape of an $\Omega$. Said seal 16 is attached on one side to the pressure vessel shell 4 and on the other side to a flat horizontal flange 18 which is rigidly fixed to the closure plug 2. One of the lips of the seal 16 is stationarily fixed on the pressure vessel shell 4 by means of screws, for example ; the other lip is secured to the flat horizontal flange 18 by removable fixing means 22.

One closure element 10 will now be described in detail.

The closure element 10 comprises three essential portions : a jack of special type for varying under the action of a fluid under pressure the distance between two points at which said device is in contact on the one hand with the closure plug and on the other hand with the pressure vessel shell ; a mechanical position-setting device which serves to compensate for the elongation caused by the action of the jack ; finally an assembly which provides a resilient coupling between the different parts of the jack for maintaining integrity of the closure element 10 at the time of removal of the plug.

The closure element 10 is essentially constituted by a cylindrical member 24 which forms a jack body and is clearly provided with an internal bore 26 in which the jack piston 28 is capable of moving. The top portion of the piston 28 is fitted with packing-rings 30 and 30'. The cylindrical member 24 which constitutes the jack body is provided at the lower portion thereof with an extension in the form of two annular members 32 and 34 which accordingly surround the piston 28. Said annular members are capable of rotating about the longitudinal axis X–X' of the jack. Moreover, the contact surface between the annular members 32 and 34 is not flat but has a special shape which will be described hereinafter. As a result of rotational displacement of one or both of the annular members, the special shape just mentioned increases the height $h'$ or distance between the top face 36 of the annular member 32 and the bottom face 38 of the annular member 34. Moreover, the lower end of the piston 28 is provided with an annular shoulder 40 which corresponds to an increase in diameter and thus limits the penetration of said piston into the jack body which is constituted by the cylindrical member 24 and the annular members 32 and 34. Thus the bottom face 38 of the annular member 34 is capable of coming into contact with the annular shoulder 40 of the piston 28. Moreover, the member 24 is provided with a duct 42 for introducing a fluid under pressure into the top end of the bore 26 between the face 44 of the cylindrical member 24 and the top face 46 of the piston 28. The upper extremity of the member 24 has a concave cylindrical portion of surface 48 which cooperates with the convex cylindrical face 50 of a shoe 52, the flat face 54 of said shoe being applied against the flanged component 12 of the pressure vessel. Similarly, the lower extremity of the piston 28 has a concave cylindrical surface 56 which cooperates with the convex cylindrical surface 58 of a second shoe 60, the flat face 62 of which is in contact with the thrust-bearing pad of the reactor closure plug 2.

It is now apparent that the movement of the piston 28 is initiated by injecting a fluid under pressure through the duct 42 into the bore 26 and that the result thereby achieved is to increase the distance between the flat face 54 of the bearing shoe 52 and the flat face 62 of the bearing shoe 60. This accordingly makes it possible to apply prestress to the reactor closure plug. Moreover, the above-described connection between the shoes 52 and 60 and the jack body 24 and jack piston 28 permits a slightly non-parallel relation between the two bearing surfaces. Provision is in fact made for two false self-aligning thrust-bearings.

The method adopted for maintaining the jack assembly in position when one end of the closure element 10 is no longer in contact with a bearing member will now be described.

In order to maintain the bearing shoes 52 and 60 against the piston 28 and the jack body 24, the closure element 10 is provided with two struts 64 and 64' which are placed on each side of said device. Each strut is constituted by two connecting-arms 66 and 68 (66' and 68' respectively) which are joined resiliently to each other and connected to the bearing shoes.

A cylindrical bore 69 is formed at one end of the connecting-arm 66 and a trunnion 70 which is integral with the bearing shoe 52 is engaged in said bore. Similarly, the connecting-arm 66' is capable of rotating about a trunnion 70'. It is readily apparent that the trunnions 70 and 70' are in aligned relation. The connecting-arm 66 is provided at the other end with a stirrup-piece 72.

Similarly, a bore 74 is formed at one end of the connecting-arm 68 and a trunnion 76 which is integral with the bearing shoe 60 is inserted in said bore. It is readily apparent that the arm 68' of the strut 64' also has a bore 74' in which is engaged a trunnion 76'. The trunnions 76 and 76' are naturally placed in alignment. Provision is made at the other end of the connecting-arm 68 for a T-shaped component 78. Said component 78 is capable of displacement in translational motion inside the compartment 80 formed within the interior of the stirrup-piece 72 of the connecting-arm 66. Moreover, two springs 82 and 82' tend to urge the component 78 away from the lower cross-member 84 of the stirrup-piece 72, thus having the effect of applying the bearing shoes 52 and 60 respectively against the jack body 24 and against the piston 28. Moreover, the lower cross-member 84 has a thinner portion 86 which passes through a bore 88 formed in the connecting-arm 68. Said bore clearly has a sufficient height $h$ to permit relative displacement of the connecting-arms 66 and 68.

The same resilient connection system is evidently provided between the arms 66' and 68' of the strut 64'. It is readily apparent that provision could be made for other resilient connection means between the arms 66 and 68.

Figure 4:
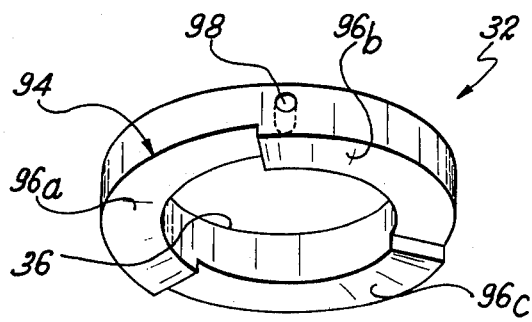
FIG. 4 is a partial view in perspective of the device showing the shape of one of the two annular position-setting members.

The annular member 32 is shown in perspective in FIG. 4. As can readily be noted, the annular member 32 has a flat top face 36. On the contrary, the bottom face 94 of said member (namely the face which is in contact with the top face of the annular member 34) is not flat but constituted by three sectors 96a, 96b and 96c each having a helicoidal surface whose axis is common with the axis of the annular member 32. A means for initiating the pivotal motion of said annular member 32 is inserted in a bore 98 formed in this latter. The annular member 34 is also provided with three sectors each having a helicoidal surface. It can therefore be clearly understood that, when the three sectors of the annular members 32 and 34 are completely in contact with each other, the distance $h'$ between the flat faces 36 and 40 of the annular members 32 and 34 is of minimum value. By rotating either of the two annular members 32 and 34, the value of $h'$ is accordingly increased. Said annular members 32 and 34 therefore make it possible to replace the compressive force applied initially by the hydraulic jack by a mechanical compressive force. In fact, at the time of injection of the fluid under pressure, the piston 28 emerges to a partial extent from the jack body 24, thus suppressing the contact between the shoulder surface 40, the annular members 32 and 34 and the bottom face of the jack body 24. By rotating the annular member 32, the contact is re-established by increasing the distance $h'$.

It would clearly be possible to have a number of portions of helicoidal surface other than three although it remains desirable to make provision for at least two of these latter.

The operation of the device in accordance with the invention at the time of opening of the concrete pressure vessel of the reactor is as follows:

a. the reactor vessel is depressurized and the jacks of the closure elements 10 are put under pressure;

b. the annular member 32 of each closure element is operated so as to reduce the height $h'$ to its minimum value;

c. the pressure within the jacks is reduced to zero, which is equivalent to suppression of the force exerted on the closure plug 2;

d. the closure elements 10 are caused to pivot about their bottom trunnions and then removed.

It is then only necessary to detach the elements which serve to secure the $\Omega$ seal to the closure plug, to flood the closure plug zone and to remove said plug by means of a travelling bridge crane.

In order to replace the closure plug and to reapply the prestress, the same operations are of course carried out but in the reverse order.

This type of locking unit is particularly well suited to the closure of shield plugs of nuclear reactor pressure vessels. In this case, the working stroke of the piston is in fact of very small value but the forces applied are of considerable magnitude. The two annular members do in fact meet these requirements since they make it possible to employ large bearing surfaces (corresponding to the thickness of the jack bodies) and since the small angular displacement permitted by said members is wholly sufficient as has been demonstrated in the foregoing description.

What we claim is:

1. A device for closing the top plug of the prestressed concrete pressure vessel of a nuclear reactor against the plug seating, wherein said device comprises a plurality of closure elements uniformly spaced at the periphery of said closure plug, each closure element being applied at one end against the top face of said plug and at the other end against a corbel formed on the top extension of the pressure vessel, each closure element being essentially constituted by a jack body in which the closed extremity is rigidly fixed to a first articulated bearing shoe and by a piston which is capable of moving within said jack body under the action of a fluid under pressure, the extremity of said piston which emerges from said jack body being provided with an annular shoulder for preventing penetration of said piston into the interior of said jack body to the full extent, said jack body being provided with adjustable mechanical means for ensuring contact between said jack body and said annular shoulder of said piston irrespective of the position of said piston with respect to said jack body and for maintaining their position after reducing the pressure within the jack to zero, the emergent extremity of said piston being rigidly fixed to a second articulated bearing shoe.

2. A device according to claim 1, wherein the adjustable mechanical means are constituted by two annular members forming an extension of the jack body and surrounding said piston, the first annular member being provided with a flat face in contact with the open extremity of the jack body and with a surface which is in contact with the second annular member and constituted by at least two relatively displaced portions of helicoidal surface, the shape of the second annular member being identical with that of the first and the two non-flat faces being in contact with each other.

3. A device according to claim 1, wherein each shoe has a bearing surface of convex cylindrical shape, the cylindrical face of the first shoe of a closure element being adapted to cooperate with a portion of concave cylindrical surface formed at the closed extremity of the jack body, the cylindrical face of the second shoe of said closure element being adapted to cooperate with a portion of concave cylindrical surface formed at the free extremity of the piston.

4. A device according to any one of claims 1 to 3, wherein each closure element has two struts parallel to the axis of the jack body and placed on each side of said element, each strut being constituted by two connecting-arms located in the line of extension of each other, each connecting-arm being pivotally attached at one end to one of said bearing shoes and resiliently coupled at the other end to that extremity of the other connecting-arm which is not pivotally attached to the other bearing shoe.

* * * * *